(12) United States Patent
Clark et al.

(10) Patent No.: US 7,185,588 B2
(45) Date of Patent: Mar. 6, 2007

(54) INFLATOR DEVICES HAVING A MOISTURE BARRIER MEMBER

(75) Inventors: Marcus Clark, Kaysville, UT (US); Bradley W. Smith, Ogden, UT (US); Alan R. Larsen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 495 days.

(21) Appl. No.: 10/729,769

(22) Filed: Dec. 5, 2003

(65) Prior Publication Data

US 2005/0123406 A1 Jun. 9, 2005

(51) Int. Cl.
*C06D 5/00* (2006.01)
(52) U.S. Cl. .................. 102/530; 280/741; 114/238
(58) Field of Classification Search ............... 280/741; 102/530; 114/238
See application file for complete search history.

(56) References Cited

U.S. PATENT DOCUMENTS

| | | | |
|---|---|---|---|
| 3,147,710 A | 9/1964 | Gluckstein |
| 3,794,535 A | 2/1974 | Bertrand et al. |
| 4,089,716 A | 5/1978 | Goddard et al. |
| 4,244,758 A | 1/1981 | Garner et al. |
| 4,246,051 A | 1/1981 | Garner et al. |
| 4,249,673 A | 2/1981 | Katoh et al. |
| 4,339,288 A | 7/1982 | Camp |
| 4,590,041 A | 5/1986 | Hill |
| 4,627,352 A | 12/1986 | Brachert et al. |
| 4,698,107 A | 10/1987 | Goetz et al. |
| 4,878,690 A | 11/1989 | Cunningham |
| 5,101,730 A | 4/1992 | Bender et al. |
| 5,345,873 A | 9/1994 | Lauritzen et al. |
| 5,454,593 A | 10/1995 | Armstrong et al. |
| 5,470,406 A | 11/1995 | Ochi et al. |
| 5,483,813 A | 1/1996 | Clark et al. |
| 5,623,116 A | 4/1997 | Hamilton et al. |
| 5,670,738 A | 9/1997 | Storey et al. |
| 5,681,055 A | 10/1997 | Green et al. |
| 5,716,072 A | 2/1998 | O'Driscoll |
| 5,772,242 A | 6/1998 | Ueda et al. |
| 5,871,228 A | 2/1999 | Lindsey et al. |
| 5,882,036 A | 3/1999 | Moore et al. |
| 5,944,343 A | 8/1999 | Vitek et al. |
| 6,000,718 A | 12/1999 | Krupp |
| 6,029,994 A | 2/2000 | Perotto et al. |
| 6,053,110 A | 4/2000 | Marchant et al. |
| 6,077,372 A | 6/2000 | Mendenhall et al. |
| 6,083,331 A | 7/2000 | Taylor et al. |
| 6,095,559 A | 8/2000 | Smith et al. |

(Continued)

*Primary Examiner*—Michael J. Carone
*Assistant Examiner*—Gabriel J. Klein
(74) *Attorney, Agent, or Firm*—Sally J Brown; Pauley Peterson & Erickson (57) ABSTRACT

An inflator device including a housing defining a storage chamber and a supply of gas generant material disposed within the storage chamber. The inflator device includes an initiator assembly having an initiator in actuating communication with the supply of gas generant material. A moisture barrier member is disposed between the initiator assembly and the supply of gas generant material. The moisture barrier member acts to prevent moisture transmission from the initiator assembly to the supply of gas generant material. Upon actuation of the initiator, however, the moisture barrier member ruptures to permit reaction initiating communication between the initiator and at least a portion of the supply of gas generant material contained within the inflator device.

12 Claims, 3 Drawing Sheets

U.S. PATENT DOCUMENTS

| | | |
|---|---|---|
| 6,096,147 A | 8/2000 | Taylor et al. |
| 6,129,023 A | 10/2000 | Marsaud et al. |
| 6,132,480 A | 10/2000 | Barnes et al. |
| 6,142,519 A | 11/2000 | Smith |
| 6,168,200 B1 | 1/2001 | Greist, III et al. |
| 6,237,498 B1 | 5/2001 | Winterhalder et al. |
| 6,244,623 B1 | 6/2001 | Moore et al. |
| 6,314,889 B1 | 11/2001 | Smith |
| 2002/0113420 A1* | 8/2002 | Neunzert et al. ............ 280/736 |
| 2003/0155757 A1* | 8/2003 | Larsen et al. ................ 280/741 |

* cited by examiner

FIG.4

INFLATOR DEVICES HAVING A MOISTURE BARRIER MEMBER

BACKGROUND OF THE INVENTION

This invention relates generally to inflator devices such as used in vehicular safety restraint installations and, more particularly, to inflator devices such as desirably reduce, minimize and/or avoid moisture communication to moisture sensitive contents thereof.

Inflator devices such as used in vehicular safety restraint installations commonly employ gas generant materials which, upon actuation by an initiator device, desirably react or otherwise produce or form gas, such as may be used to inflate an inflatable airbag cushion or bag. Such gas generant materials are commonly formed as a tablet or other gas generant body having a predetermined shape and size. As will be appreciated, the selected shape and size of a gas generant material body can desirably be varied to provide a particular surface area, as the surface of a gas generant body can provide a convenient means of control over the rate of production of gas upon reaction of the gas generant material. Various gas generant materials, however, are known to be moisture sensitive. In view thereof, it is desirable that associated inflator devices store or contain such gas generant materials in a sealed or airtight chamber.

In addition, various gas generant material forms or bodies, such as tablets, for example, have been known to be prone to chipping or otherwise undesirably breaking, such as, for example, during assembly of the inflator device or upon actuation of the initiator, which can undesirably increase surface area and have an undesirable effect on the rate of gas production. In addition, it is known to coat various gas generant material bodies, such as tablets, for example, with an igniter material such as to increase the rate of gas production. Chipping and breaking of such igniter material coated gas generant material bodies can have an undesirable effect on the performance and use of such coated gas generant bodies.

Initiator assemblies are known for use in joining an initiator to an inflator device housing. Initiator assemblies known in the art are often used to seal the inflator device storage chamber containing the gas generant material at one end. Recent initiator assemblies include an injection molded adaptor formed around the initiator. Injection molded adaptors, such as typically formed at least in part by a thermoplastic material, can provide significant advantages both in manufacture and in reducing costs. Unfortunately, however, some thermoplastic materials are known to absorb and transmit moisture. Moreover, although the rate of moisture transmission through specific thermoplastic materials may be relatively low, over the design life or term of use common for inflator devices such as used in vehicular inflatable restraint systems, even such relatively low rates of moisture transmission can have detrimental effects on the performance of at least certain gas generant materials and the inflator devices which include or contain such gas generant materials.

In view of the above, there remains a continuing need and a demand for improvements in inflator devices. In particular, there remains a need and a demand for improvements in inflator devices whereby moisture transmission from an initiator assembly to the supply of gas generant material contained within the inflator device is desirably reduced, minimized or otherwise prevented or avoided.

SUMMARY OF THE INVENTION

A general object of the invention is to provide an improved inflator device.

A more specific objective of the invention is to overcome one or more of the problems described above.

The general object of the invention can be attained, at least in part, through an improvement in an inflator device that includes a housing defining a storage chamber. A supply of gas generant material is disposed within the storage chamber and an initiator assembly is joined to the housing. The initiator assembly includes an initiator in actuating communication with the supply of gas generant material. In accordance with certain preferred embodiments, the invention involves the improvement of a moisture barrier member that is disposed between the initiator assembly and the supply of gas generant material. The moisture barrier member prevents moisture transmission from the initiator assembly to the supply of gas generant material. The moisture barrier member, however, ruptures upon actuation of the initiator.

The prior art generally fails to provide inflator devices wherein moisture transmission to a supply of gas generant material contained there within can desirably be reduced, minimized or otherwise prevented or avoided in a manner which is as simply, efficient and cost effective as may otherwise be desired. In particular, the prior art generally fails to provide inflator devices wherein moisture transmission from an initiator assembly, such as at least in part formed from a thermoplastic material, to a supply of moisture sensitive gas generant material there within contained, is desirably reduced, minimized or otherwise prevented or avoided in a manner which is one or more of increased or improved simplicity, efficiency and cost effectiveness.

The invention further comprehends an inflator device that includes a housing defining a storage chamber having an inner surface. A supply of gas generant material is disposed within the storage chamber and an initiator assembly is joined to the housing. The initiator assembly includes an initiator in actuating communication with the supply of gas generant material. In accordance with one preferred embodiment of the invention, a specified non-planar moisture barrier member is disposed between the initiator assembly and the supply of gas generant material. The non-planar moisture barrier member includes a base portion having a first surface facing the initiator assembly and a second surface on a side opposite the first surface and facing the supply of gas generant material. An outer edge of the moisture barrier member is adjacent the storage chamber inner surface and a sleeve extends from the moisture barrier member outer edge. The moisture barrier member includes a cup portion extending from the base portion second surface. The non-planar moisture barrier member is disposed adjacent the initiator assembly and the cup portion is in covering relation with at least a portion of the initiator. The non-planar moisture barrier member prevents moisture transmission from the initiator assembly to the supply of gas generant material. Upon actuation of the initiator, the non-planar moisture barrier member ruptures.

The invention still further comprehends an inflator device including a housing defining a storage chamber having an inner surface. A baffle is at least partially disposed within the storage chamber. The baffle includes a passageway and a plurality of exit holes. A supply of gas generant material is disposed within the storage chamber and outside the baffle passageway. An initiator assembly is joined to the housing. The initiator assembly includes an initiator in actuating communication with the supply of gas generant material, with the initiator at least in part contained within the baffle passageway. A non-planar moisture barrier member is disposed between the initiator assembly and the supply of gas generant material. The non-planar moisture barrier member includes a base portion having a first surface facing the initiator assembly and a second surface on a side opposite the first surface and facing the supply of gas generant material. An outer edge of the moisture barrier member is adjacent the housing inner surface and a sleeve extends from the moisture barrier member outer edge. The moisture barrier member includes a cup portion extending from the base portion second surface. The non-planar moisture barrier member is disposed adjacent the initiator assembly with the cup portion in covering relation with at least a portion of the initiator, and at least a portion of the cup portion disposed between the initiator and an inside surface of the baffle. The non-planar moisture barrier member prevents moisture transmission from the initiator assembly to the supply of gas generant material. Upon actuation of the initiator, the cup portion of the non-planar moisture barrier member ruptures.

As used herein, an initiator in "actuating communication" with a supply of gas generant material, refers to the positioning of an initiator such that upon receiving an electric signal through electrical conductive pins, the initiator is able to actuate or initiate reaction of the supply of gas generant material.

As used herein in reference to the functioning of the moisture barrier member relative to moisture transmission from the initiator assembly to the supply of gas generant material, the term "prevent" is understood to mean reducing moisture transmission to an acceptable level for the particular initiator assembly application. As will be appreciated by one skilled in the art following the teachings herein provided, the acceptable level of moisture transmission for a particular initiator assembly application can depend on one or more factors, such as, for example, the internal volume and/or geometry of the inflator device, the inflator device housing and/or the housing storage chamber, and the absorption rate of the particular gas generant material used. In accordance with one embodiment of the invention, the term "prevent" is understood to mean reducing moisture transmission to a moisture transmission rate of about $1.7 \times 10^{-5}$ grams water ($H_2O$) per day (24 hours) or less.

Other objects and advantages will be apparent to those skilled in the art from the following detailed description taken in conjunction with the appended claims and drawings.

DETAILED DESCRIPTION OF THE INVENTION

The present invention provides an improved inflator device such as to desirably reduce, minimize and/or avoid moisture communication there within, such as from an initiator assembly into a storage chamber that contains a supply of gas generant material.

As will be described in greater detail below, the present invention more particularly provides an inflator device having a moisture barrier member, such as disposed between a thermoplastic molded adaptor of an initiator assembly and a storage chamber containing a supply of moisture sensitive gas generant material, for example.

Figure 1:
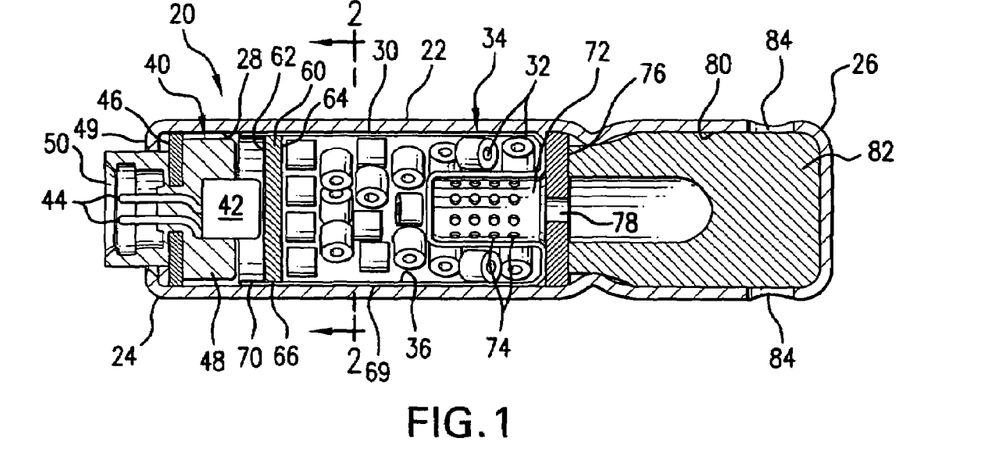
FIG. 1 shows a partial sectional view of an inflator device according to one embodiment of the invention.
Figure 2:
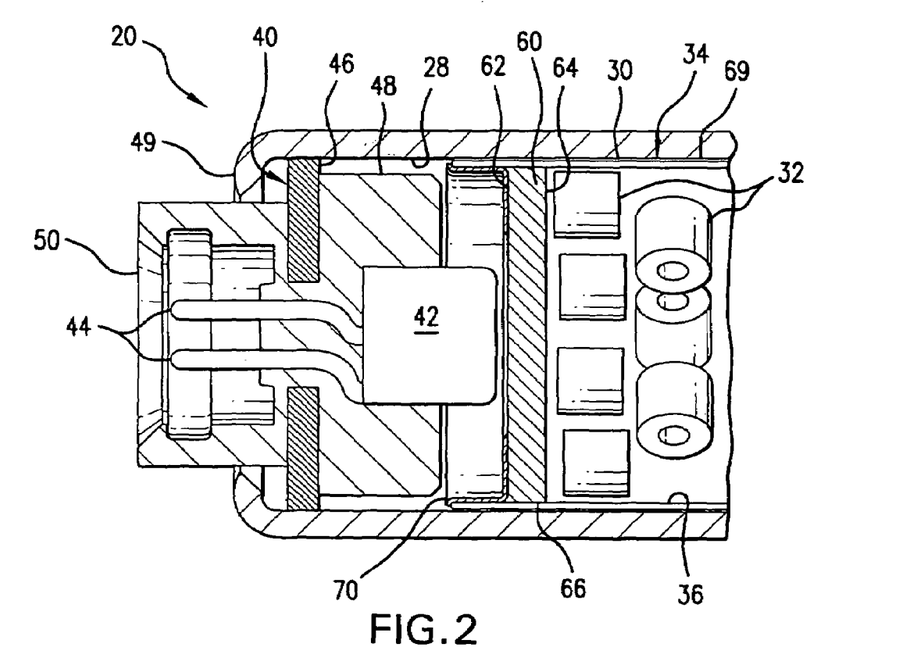
FIG. 2 shows an enlarged partial sectional view of the inflator device shown in FIG. 1.

An inflator device 20 according to one embodiment of the invention is shown in FIG. 1. An enlarged view of a portion of the inflator device 20 of FIG. 1, taken along line 2—2, is shown in FIG. 2. The inflator device 20 includes a housing 22 having a first end 24 and a second end 26 opposite the first end 24. The housing 22 shown in FIG. 1 is generally tubular in shape and an inner surface 28 of the housing 22 defines a storage chamber 30. A supply of gas generant material 32 is disposed within the storage chamber 30. In one embodiment of the invention, as shown in FIG. 1, the supply of gas generant material 32 is more particularly contained in a generant canister 34, having an inner surface 36, disposed within the storage chamber 30.

An initiator assembly 40 is joined to the housing first end 24. The initiator assembly 40 includes an initiator 42 having a pair of electrical conductive pins 44 oriented toward the housing first end 24. The initiator assembly 40 also includes a plate 46 and a molded adaptor 48 for connecting the plate 46 and the initiator 42 to form the initiator assembly 40. An orbital crimp 49 of the housing 22 at the first end 24 and/or the plate 46 can be used to securely join the initiator assembly 40 to or with the housing 22. Desirably, the plate 46 has a diameter slightly smaller than the diameter of the inner surface 28 of the housing 22 to secure the initiator assembly 40 within the housing 22. The housing 22 and the plate 46 are desirably formed of metal, and can be crimped or welded together, preferably providing a hermetical seal at the housing first end 24. A hermetic seal is generally desirable to prevent undesired contact of the gas generant material 32, such as by moisture, e.g., water or water vapor, and the ambient atmosphere such may otherwise contact the housing 22. Those skilled in the art and guided by the teachings herein provided will appreciate that assemblies that avoid such undesired contact of the gas generant material therein contained can help ensure that the gas generant material is capable of providing desired inflator output performance over the typically long life of an inflator device.

The initiator assembly 40 is joined to the housing 22 such that the initiator 42 is disposed in actuating communication with at least a portion of the supply of the gas generant material 32. In other words, the initiator 42 is joined to the housing 22 such that, upon receiving an electric charge signal, the initiator 42 is able to actuate or initiate reaction of at least a portion of the supply of gas generant material 32. The initiator assembly 40 includes a receptacle 50 containing at least part of the electrical conductive pins 44. The receptacle 50 is adapted to receive an electrical connector (not shown) through which an electric charge is carried to the electrical conductive pins 44. The initiator 42 contains a reactive charge (not shown). The reactive charge can be initiated by the electric charge received through the electrical conductive pins 44. Upon the occurrence of a predetermined condition, such as a collision, a sensor (not shown) sends an electric signal through the electrical connector to the electrical conductive pins 44. The electric signal initiates reaction of the reactive material to actuate the initiator 42 to produce reaction products.

As will be appreciated by those skilled in the art and following the teachings herein provided, the initiator 42 can include one or more known reactive charge materials, such as a pyrotechnic, which can be actuated by an electric current introduced through conductive pins 44. The reactive charge can, for example, include a fuel slurry and an oxidizer slurry mixed together and positioned in the initiator. Examples of reactive charges known in the art and useful in the actuator device of this invention include mixtures including zirconium and potassium perchlorate (ZPP). As will also be appreciated by those skilled in the art following the teachings herein provided, various gas generant materials, such as are known in the art, are available for use in inflator device in accordance with the invention. The supply of gas generant material desirably includes a plurality of gas generant material bodies having a form selected from a group consisting of tablets, wafers, extrudlets and combinations thereof. In one embodiment of this invention, at least a portion of the plurality of gas generant material bodies contained within the storage chamber 30 are preferably coated with an igniter material, such as known in the art.

The molded adaptor 48 of the initiator assembly 40 is preferably formed of a thermoplastic material, such as nylon, for example. In one preferred embodiment of the invention, the molded adaptor 48 can be applied to the initiator assembly 40 by an injection molding process in which a liquid or flowable material is disposed about portions of the initiator 42 and the plate 46. When the injection molded adaptor 48 solidifies, the initiator 42 and the plate 46 are fixedly held to the molded adaptor 48. Those skilled in the art and guided by the teachings herein provided will appreciate that the molded adaptor 48 can be formed from a variety of materials including various thermoplastic or similar compositions such as known in the art. Further, in accordance with certain preferred embodiments of the invention such materials as are conducive to processing via injection molding and such as are well-suited for providing electrical insulation are preferred.

In general, properties or conditions important in the selection of an appropriate material for such applications include: tensile and impact strength, electrical insulating properties or characteristics, as well as having a melt temperature desirably lower than the autoignition temperature of the associated reactive charge material. Glass-reinforced nylon is one currently preferred material for use in forming such a molded adaptor in accordance with the invention. Such use of nylon is generally desirable due to various of the properties or qualities of nylon, including, for example, its molding qualities and strength. Examples of other useful or suitable materials for use in such applications include glass-reinforced polyester and glass-reinforced polyetherimide. Moreover, those skilled in the art and guided by the teachings herein provided will appreciate that other materials, e.g., other thermoplastic materials such as known in the art, may also be suitable and used in the practice of the invention in various embodiments.

As identified above, various gas generant materials are known to be moisture sensitive. Consequently, gas production via such gas generant materials as well as the output and performance of inflator devices which incorporate and rely on reaction of such gas generant materials can be diminished over time such as a result of contact by such gas generant materials with moisture such as from the ambient atmosphere. As discussed above, the initiator assembly 40 desirably seals the first end of the housing 22 to prevent ambient air and moisture from entering the housing 22 therethrough, thereby properly or desirably maintaining the supply of gas generant material 32 over the design life of the inflator device 20. Various particular thermoplastic materials, however, are known to absorb and transmit moisture. As discussed above, nylon is a preferred thermoplastic material useful for forming molded initiator assembly adaptors. Unfortunately, however, nylon is an example of a thermoplastic material known to absorb and transmit moisture. Although the rate of moisture transmission by nylon is relatively low, even small amounts of moisture over the extended life of a typical inflator device, often averaging about fifteen years, can be detrimental to the gas generant material contained within such an inflator device.

The inflator device 20 shown in FIGS. 1 and 2 includes a moisture barrier member 60 disposed between the initiator assembly 40 and the supply of gas generant material 32. As described in greater detail below, the moisture barrier member 60 serves or acts to prevent moisture transmission from the initiator assembly 40, such as, more particularly, from the molded adaptor 48, to the supply of gas generant material 32.

In the embodiment shown in FIGS. 1 and 2, the moisture barrier member 60 is planar and has a first surface 62 facing the initiator assembly 40 and a second surface 64 on a side opposite the first surface 62 and facing the supply of gas generant material 32. The moisture barrier member 60 extends across the generant canister 34 such that an outer edge 66 of the moisture barrier member 60 is in contact with the inner surface 36 of the generant canister 34.

The moisture barrier member 60 is desirably made or formed of a material that prevents moisture transmission, thereby serving to provide an effective moisture seal. In one embodiment of the invention, the moisture barrier member is formed of a material having a moisture transmission rate of about $1.7 \times 10^{-5}$ grams water ($H_2O$) per day (24 hours) or less. Further, in accordance with certain preferred embodiments of the invention the moisture barrier member 60 is preferably composed of a deformable material, such as ethylene propylene rubber. The use of a moisture barrier member formed of a deformable material facilitates such a moisture barrier member as desirably also acting or serving as a damper pad or the like between the initiator assembly and the gas generant material. As discussed above, the supply of gas generant material is preferably in a predetermined form, such as tablets as shown in FIGS. 1 and 2, and sized such as to provide a desired surface area and, therefore, result in a desired rate of reaction. As a result, the rate at which inflation gas is formed and subsequently released from a corresponding inflator device can be more accurately and effectively controlled. In particular, the amount or extent of movement of the gas generant material within the storage chamber of an inflator device is preferably limited such as to avoid chipping and breaking of the gas generant material bodies or forms therein contained. In addition, in one embodiment of the invention, at least some of the gas generant material bodies are coated with an igniter material to facilitate the desired reaction of the gas generant material. As identified above, chipping and breaking of such igniter material coated gas generant material bodies or forms can be particularly troublesome. As will be appreciated by those skilled in the art and guided by the teachings herein provided, the practice of the invention wherein the moisture barrier member also acts as a damper pad can desirably serve to reduce or avoid chipping and breaking of gas generant material bodies or forms, including gas generant material bodies or forms coated with an igniter material.

The generant canister 34, shown in FIG. 1, is generally composed of a canister body 69 and a canister lid 70 joined together in an appropriate selected manner such as shown, for example. In the illustrated embodiment, the canister lid 70 serves to close the end of the generant canister 34 disposed toward the initiator assembly 40. The generant canister 34 may advantageously be situated adjacent the initiator assembly 40, such as to facilitate the direct communication therewith by the initiator 42 upon the actuation thereof. In the illustrated embodiment, the canister lid 70 is disposed between the initiator assembly 40 and the moisture barrier member 60. It is to be understood, however, that the broader practice of the invention is not necessarily limited to inflator assemblies which include or incorporate a generant canister to contain or hold the gas generant material. Thus, if desired, the invention can be practiced with or inflator assemblies that do not include a generant canister.

A generant canister, if included, can desirably be formed of a metal, such as steel, copper, brass, aluminum or the like, for example. Further, such metal material of construction can, if desired, include a suitable coating such as to provide increased corrosion resistance. In accordance with one preferred embodiment of the invention, the generant canister is formed of brass.

As shown, the moisture barrier member 60, together with the supply of gas generant material 32, can desirably be disposed or contained within the generant canister 34.

The inflator device 20 also desirably includes a baffle 72 at an end of the generant canister 34 opposite the initiator 42. The baffle 72 includes at least one and, desirably, a plurality of inflation gas passage orifices 74 through which, as described in greater detail below, inflation gas exiting the generant canister 34 can enter into the baffle 72 for ultimate discharge from the inflator device 20.

The inflator device 20 includes an orifice plate 76 having an orifice 78 passing therethrough. The orifice plate 76 separates the baffle 72 from a drawing chamber 80. The drawing chamber 80 contains a gas treatment element, generally designated by the reference numeral 82, such as may desirably serve to filter, cool and/or otherwise treat the inflation gas prior to discharge from the inflator device 20 through a plurality of outlet ports 84 formed in the wall of the drawing chamber 80. As will be appreciated by one skilled in the art following the teachings herein provided, the size, shape, construction and configuration of the baffle, inflation gas passage orifices, gas treatment element, drawing chamber and outlet ports can be appropriately varied dependent on factors such as the configuration and desired performance of the inflator device.

Actuation of the initiator 42 results in the formation of reaction products that serve or act to rupture or otherwise open the canister lid 70 and the moisture barrier member 60, respectively, such as to permit reaction initiating communication between the initiator 42 and at least a portion of the supply of gas generant material 32 contained within the inflator device 20. More specifically, with such opening, the reaction products contact the supply of gas generant material 32 which initiates the reaction thereof and the production of inflation gas. When the pressure resulting therefrom becomes sufficiently great, the canister body 69 ruptures or otherwise opens such as to allow the inflation gas to pass through the inflation gas passage orifices 74, into the baffle 72, through the orifice plate orifice 78, into the inflator device drawing chamber 80 and the gas treatment element 82 therein contained and ultimately through the outlet ports 84, out of the inflator device 20 and toward or into an associated inflatable airbag cushion (not shown).

Figure 3:
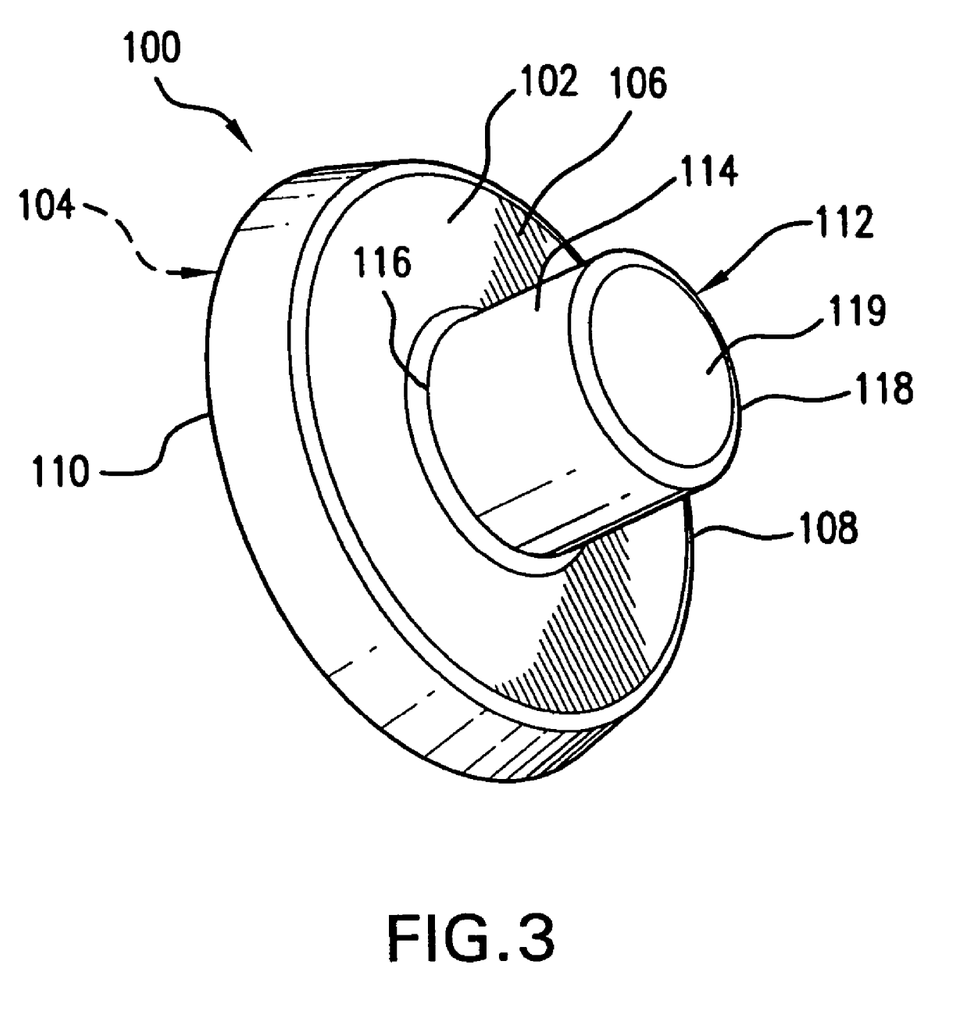
FIG. 3 shows a moisture barrier member according to one embodiment of the invention.

Turning now to FIG. 3, there is illustrated a moisture barrier, designated by the reference numeral 100, in accordance with another preferred embodiment of the invention. The moisture barrier member 100 is generally non-planar and includes a base portion 102, having a first surface 104 opposite a second surface 106, and an outer edge 108. A sleeve portion 110 extends from the outer edge 108. In one preferred practice of the invention, the moisture barrier member 100 is desirably disposed adjacent to an initiator assembly and at least a portion of the sleeve portion 110 is designed to fit over and around at least a portion of the initiator assembly between the initiator assembly and a housing inner surface.

The moisture barrier member 100 includes a centrally disposed cup portion 112 extending from the second surface 106. The cup portion 112 includes a side wall 114 attached to the base portion 102 at a side wall first end 116. The side wall 114, at a side wall second end 118, is attached to an end wall 119. In one embodiment, the moisture barrier member is disposed adjacent an initiator assembly with the cup portion in covering relation with at least a portion of the initiator. As will be appreciated by one skilled in the art following the teachings herein provided, upon actuation of the initiator, the end wall 119 of the cup portion 112 is desirably ruptured. If desired, and in accordance with one preferred embodiment of the invention, the end wall 119 desirably is of a thickness less than the thickness of the base portion 102, thereby facilitating the rupture of the end wall 119.

As will be appreciated by one skilled in the art and following the teachings herein provided, a non-planar moisture barrier member in accordance with the invention may include either the sleeve portion or the cup portion, or both the sleeve portion and the cup portion, such as depending on the configuration of the inflator device in which the moisture barrier member is to be used. In one embodiment of the invention, the non-planar moisture barrier member is an integrally molded one-piece member.

Figure 4:
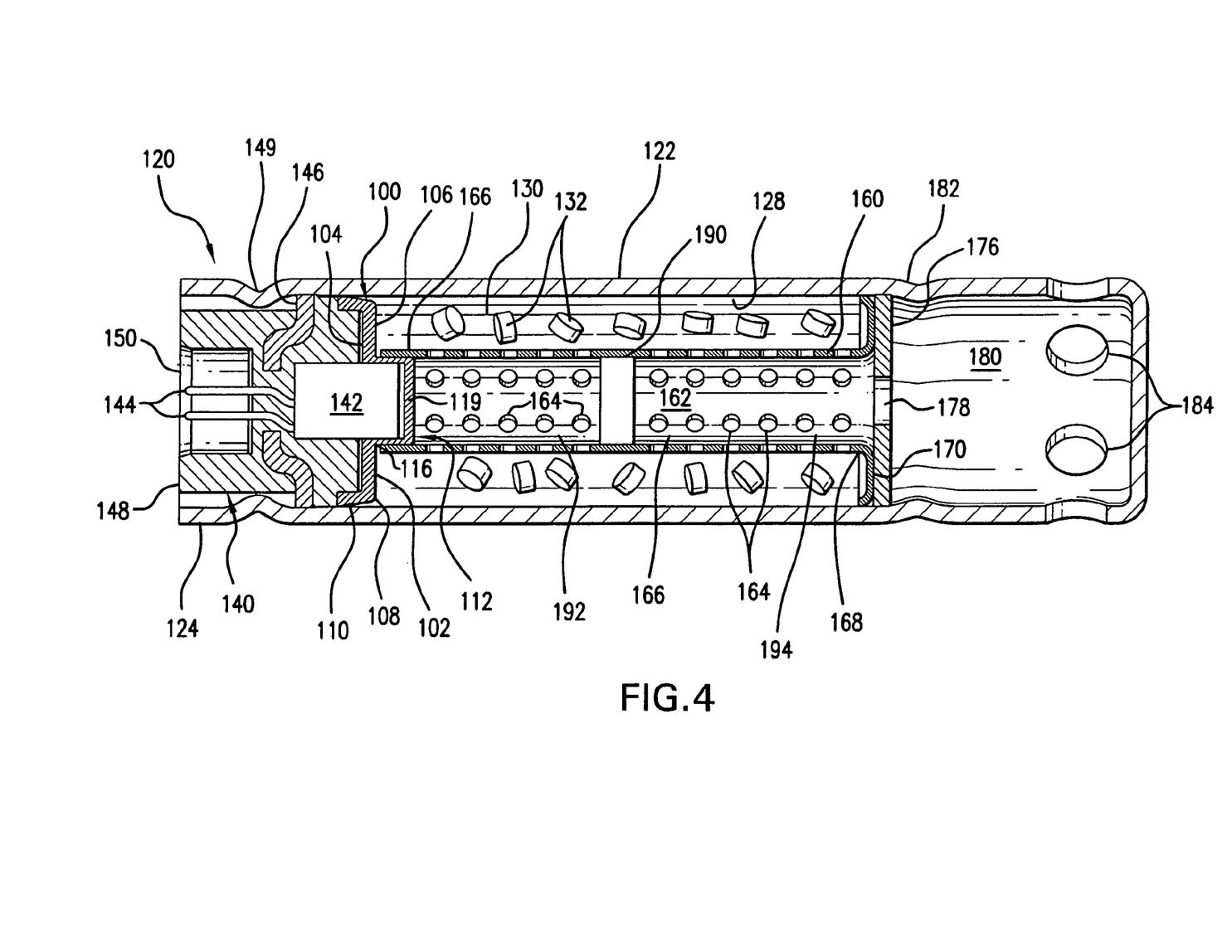
FIG. 4 shows a partial sectional view of an inflator device according to another embodiment of the invention, and including the moisture barrier member of FIG. 3.

FIG. 4 illustrates an inflator device 120 containing the moisture barrier member 100, shown in FIG. 3. The inflator device 120 includes a housing 122 having a housing first end 124 and an inner surface 128 defining a storage chamber 130. A supply of gas generant material 132 is disposed within the storage chamber 130.

An initiator assembly 140 is joined to the housing first end 124. The initiator assembly 140 includes an initiator 142 having a pair of electrical conductive pins 144 oriented toward the housing first end 124. The initiator assembly 140 also includes a plate 146 and a molded adaptor 148 connecting the plate 146 and the initiator 142. A first crimp 149 in the housing 122 and/or welding the plate 146 can be used to securely join the initiator assembly 140 to the housing 122. The housing 122 and the plate 146 are desirably formed of metal, and can be crimped or welded together, preferably providing a hermetical seal at the housing first end 124. As discussed above, such a hermetic seal is generally desirable to prevent ambient air and moisture from contacting the gas generant material 132 and such as can help ensure that the gas generant material is capable of providing desired inflator output performance over the typically long life of the inflator device.

The initiator 142 is disposed in actuating communication with the supply of gas generant material 132. The initiator assembly 140 includes a receptacle 150 containing at least a portion of the electrical conductive pins 144. The receptacle 150 is adapted to receive an electrical connector (not shown) through which an electric charge is carried to the electrical conductive pins 144. The initiator 142 contains a reactive charge (not shown), the reaction of which can be initiated by the electric charge received through the electrical conductive pins 144. Upon the occurrence of a predetermined condition, such as a collision, a sensor (not shown) sends an electric signal through the electrical connector to the electrical conductive pins 144. The electric signal initiates reaction of the reactive material to actuate the initiator 142 to produce reaction products.

A baffle 160 is at least partially disposed within the storage chamber 130. The baffle 160 includes a passageway 162 and a plurality of gas passage orifices 164. The supply of gas generant material 132 is disposed within the storage chamber 130 between the baffle 160 and the housing inner surface 128. The baffle 160 has a first end 166 toward and partially surrounding the initiator 142. The baffle 160 has a second end 168 including a flange 170 adjacent an orifice plate 176. The orifice plate 176 includes an orifice 178 that connects the baffle passageway 162 and a drawing chamber 180. The orifice plate 176 can be secured in the housing 122, as may be desired, such as by a second crimp 182. The first crimp 149 and the second crimp 182 can also be used to secure the inflator device 120 in an airbag installation, for example, in an automobile. The drawing chamber 180 includes a plurality of outlet ports 184.

The non-planar moisture barrier member 100, as shown in FIG. 3, is disposed adjacent the initiator assembly 140 and between the initiator assembly 140 and the supply of gas generant material 132. The first surface 104 of the moisture barrier member base portion 102 faces the initiator assembly 140 and the second surface 106 of the moisture barrier member base portion 102 faces toward the supply of gas generant material 132. In one embodiment of the invention, the outer edge of the moisture barrier member is disposed adjacent the housing inner surface. The moisture barrier member outer edge 108 is disposed adjacent the housing inner surface 128 shown in FIG. 4 and in contact with the housing inner surface 128. However, in the broader practice of the invention, the outer edge of the moisture barrier member can be disposed adjacent the inner surface and not in direct contact with the housing inner surface. For example, when a generant canister containing a supply of gas generant material, such as shown in FIG. 1, is disposed within the housing storage chamber, the moisture barrier member outer edge can be in contact with the inner surface of the generant canister, and yet is also considered adjacent the housing inner surface.

The moisture barrier member sleeve portion 110 extends from the moisture barrier outer edge 108 between a portion of the initiator assembly 140 and the housing inner surface 128. The moisture barrier member cup portion 112 is in covering relation with at least a portion of the initiator 142 and at least a portion of the cup portion 112 is disposed within the baffle 160 and between the initiator 40 and an inside surface 166 of the baffle.

The moisture barrier member 100 prevents moisture transmission from the initiator assembly 140 to the supply of gas generant 132 within the storage chamber 130. More specifically, for example, the moisture barrier member 100 prevents moisture that may be transmitted through the thermoplastic molded adaptor 148 of the initiator assembly 140. In addition, the moisture barrier member 100 prevents direct contact of the supply of gas generant material 132 with the molded adaptor 148 of the initiator assembly 140 when the inflator device 120 is in a static state prior to actuation of the initiator 142. The moisture barrier member 100 thereby, in addition to serving as a moisture barrier, also acts as or serves a damper pad relative to the supply of gas generant material 132. Upon actuation of the initiator 142, the non-planar moisture barrier member 100 ruptures. The cup portion 112 of the moisture barrier member 100 also provides a cushion between the initiator 142 and the inside surface of the baffle 166 and can thus prevent damage to the initiator 142 and/or baffle 166 as well as reduce or eliminate undesirable rattle caused by vibrations during automobile use.

Actuation of the initiator 142 results in the formation of reaction products that serve or act to rupture or otherwise open the end wall 119 of the moisture barrier member 100 and enter the baffle passageway 162. The baffle 160 shown in FIG. 4 includes a blocking element 190 that separates the baffle passageway 162 into two baffle subchambers 192 and 194. The reaction products enter the first baffle subchamber 192 and exit the baffle subchamber 192 through the gas passage orifices 164. The reaction products then initiate reaction of the supply of gas generant material 132 which produces inflation gas. The inflation gas enters the second baffle subchamber 194 through the gas passage orifices 164 and the inflation gas travels through the orifice 178 and then out through the outlet ports 184 to inflate an associate airbag (not shown). As will be appreciated by one skilled in the art following the teachings herein provided, crimping or pinching of the sides of the baffle to separate the baffle passageway into two subchambers can be used as an alternative to the inclusion and use of a blocking element. In addition, the inflator device 120 may, if desired, include a cooling filter within the drawing chamber 180, such as described above with reference to FIG. 1.

The baffle 160 helps distribute the reaction products from the initiator 142, as well as receiving and directing the inflation gas produced by the actuated gas generant material 132. The baffle 160 is also beneficial in absorbing some of the shock of the actuated initiator 142. This is desirable to maintain the predetermined shape and size of the formed bodies of the gas generant material 132, thereby providing predictable inflation gas production. As will be appreciated by one skilled in the art following the teachings herein provided, the baffle can be of various configurations and sizes, depending on the specifically desired or sought inflator device configuration and output performance.

Thus, the invention provides an inflator device wherein a moisture barrier member is preferably disposed such as to desirably reduce, minimize and/or avoid moisture communication to moisture sensitive contents thereof. In particular embodiments, the moisture barrier member is disposed to prevent moisture transmission from the initiator assembly, such as at least in part formed of a thermoplastic material, to a supply of gas generant material contained within the inflator device. In certain embodiments, the moisture barrier member may additionally act as a damper pad between the initiator assembly and the supply of gas generant material to limit movement of the gas generant material within the storage chamber, thereby minimizing or avoiding undesired chipping and breaking of gas generant material bodies and dampening the effects from actuation of an associated initiator.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an inflator device including: a housing defining a storage chamber; a supply of gas generant material disposed within the storage chamber; and an initiator assembly joined to the housing and including an initiator in actuating communication with the supply of gas generant material, the Improvement comprising:

a non-planar moisture barrier member disposed between the initiator assembly and the supply of gas generant material, wherein the moisture barrier member prevents moisture transmission from the initiator assembly to the supply of gas generant material, and wherein upon actuation of the initiator the moisture barrier member ruptures;

the moisture barrier including a first surface facing the initiator assembly, an opposed second surface facing the supply of gas generant material and an outer edge, and wherein the moisture barrier member additionally includes a sleeve portion extending from the moisture barrier member outer edge;

the moisture barrier including a base portion and a cup portion and wherein the non-planar moisture barrier member is disposed adjacent the initiator assembly with the cup portion in covering relation with at least a portion of the initiator, wherein the cup portion comprises a side wall and an end wall, the moisture barrier member base portion has a first thickness and the cup portion end wall has a second thickness, and the second thickness is less than the first thickness.

2. The inflator device of claim 1 wherein the supply of gas generant material comprises a plurality of gas generant material bodies having a form selected from a group consisting of tablets, wafers, extrudlets and combinations thereof.

3. The inflator device of claim 1, wherein the moisture barrier member prevents direct contact of the supply of gas generant material with the initiator when the inflator device is in a static state prior to actuation of the initiator.

4. The inflator device of claim 1 wherein the moisture barrier member comprises a rubber material.

5. The inflator device of claim 4 wherein the deformable material comprises ethylene propylene rubber.

6. The inflator device of claim 1 wherein the non-planar moisture barrier member is an integrally molded one piece member.

7. The inflator device of claim 1 wherein at least a portion of the supply of the gas generant material is coated with an igniter material.

8. An inflator device comprising:

a housing defining a storage chamber having an inner surface;

a baffle at least partially disposed within the storage chamber, the baffle including a passageway and a plurality of exit holes;

a supply of gas generant material within the storage chamber and outside the baffle passageway;

an initiator assembly joined to the housing, the initiator assembly including an initiator in actuating communication with the supply of gas generant material, wherein the initiator is contained at least in part in the baffle passageway; and a non-planar moisture barrier member disposed between the initiator assembly and the supply of gas generant material, the non-planar moisture barrier member including:

a base portion having a first surface facing the initiator assembly and a second surface on a side opposite the first surface and facing the supply of gas generant material;

an outer edge adjacent the storage chamber inner surface;

a sleeve extending from the moisture barrier member outer edge; and a cup portion extending from the base portion second surface, wherein the non-planar moisture barrier member is disposed adjacent the initiator assembly with the cup portion in covering relation with at least a portion of the initiator and at least a portion of the cup portion disposed between the initiator and an inside surface of the baffle;

wherein the non-planar moisture barrier member prevents moisture transmission from the initiator assembly to the supply of gas generant material and wherein upon actuation of the initiator the cup portion of the non-planar moisture barrier member ruptures.

9. The inflator device of claim 8 wherein the moisture barrier member comprises a rubber material.

10. The inflator device of claim 9 wherein the deformable material comprises ethylene propylene rubber.

11. The inflator device of claim 8, wherein the moisture barrier member prevents direct contact of the supply of gas generant material with the initiator assembly.

12. The inflator device of claim 8 wherein the non-planar moisture barrier member is an integrally molded one piece member.

* * * * *